United States Patent
Anstett et al.

(10) Patent No.: US 9,624,954 B2
(45) Date of Patent: Apr. 18, 2017

(54) PLURAL TAPERED FASTENER WITH MATERIAL RECEIVING INWARD REGION

(71) Applicant: Powernail Company, Lake Zurich, IL (US)

(72) Inventors: Todd J. Anstett, Island Lake, IL (US); Thomas M. Anstett, Long Grove, IL (US)

(73) Assignee: Powernail Company, Lake Zurich, IL (US)

( * ) Notice: Subject to any disclaimer, the term of this patent is extended or adjusted under 35 U.S.C. 154(b) by 187 days.

(21) Appl. No.: 14/574,035

(22) Filed: Dec. 17, 2014

(65) Prior Publication Data

US 2016/0177994 A1    Jun. 23, 2016

(51) Int. Cl.
| F16B 15/08 | (2006.01) |
| F16B 15/02 | (2006.01) |
| F16B 15/06 | (2006.01) |

(52) U.S. Cl.
CPC ............. *F16B 15/08* (2013.01); *F16B 15/02* (2013.01); *F16B 15/06* (2013.01)

(58) Field of Classification Search
CPC .................................. F16B 15/08; F16B 15/02
USPC .............. 411/488, 439, 486, 442, 923, 451.1
See application file for complete search history.

(56) References Cited

U.S. PATENT DOCUMENTS

| 386,404 A | 7/1888 | Jones | |
| 808,968 A * | 1/1906 | Boda | ........................ B21G 3/12 |
| | | | 411/489 |
| 975,235 A | 11/1910 | Hansen | |
| 1,012,622 A * | 12/1911 | Frost | ........................ A01L 7/10 |
| | | | 411/489 |
| 1,092,351 A | 4/1914 | Garrity | |
| 2,215,205 A | 7/1939 | Biernacki | |
| 2,428,259 A | 9/1947 | Anstett | |
| 2,593,647 A | 11/1947 | Anstett | |
| 2,438,793 A | 3/1948 | Vogel | |
| 2,468,821 A * | 5/1949 | Goodstein | ............... F16B 15/08 |
| | | | 227/119 |
| 2,649,831 A | 8/1953 | Anstett | |

(Continued)

FOREIGN PATENT DOCUMENTS

CA        2280539        12/2008

*Primary Examiner* — Flemming Saether
(74) *Attorney, Agent, or Firm* — Jansson Munger McKinley & Kirby Ltd.

(57) ABSTRACT

A plural tapered fastener with a material receiving inward region. Fastener embodiments have particular utility in penetrating and securing work pieces of high density material, such as medium density fiberboard and high density fiberboard, without blemishing of the workpiece. A fastener may have a head and a shank extending from the head with an axis being defined by the shank and head. A head projection extends from a proximal end to a distal end away from the axis. A tapered portion is provided in the shank which tapers the shank axially inward to the head to define a material-receiving tapered inward region. A further tapered portion is provided along a lower leading edge of the head projection. During fastener driving, the inward region receives displaced workpiece material and the tapered head projection better penetrates the workpiece providing for more complete fastener driving with minimized blemishing of the workpiece.

10 Claims, 9 Drawing Sheets

(56) References Cited

U.S. PATENT DOCUMENTS

| | | | | |
|---|---|---|---|---|
| 2,747,821 A | * | 5/1956 | Falk | F16B 15/02 |
| | | | | 248/71 |
| 2,868,057 A | | 1/1959 | Anstett | |
| 3,099,108 A | | 7/1963 | Kalkbrenner | |
| 3,130,425 A | * | 4/1964 | Kelly | B21G 3/005 |
| | | | | 411/489 |
| 3,304,106 A | | 2/1967 | McCormack | |
| 3,882,755 A | | 5/1975 | Enstrom | |
| 4,122,752 A | | 10/1978 | Hallock | |
| 4,289,058 A | | 9/1981 | Paskert | |
| 4,809,849 A | | 3/1989 | Kozyrski et al. | |
| 5,060,797 A | | 10/1991 | Sygnator | |
| 5,971,688 A | | 10/1999 | Anstett | |
| 6,139,238 A | | 10/2000 | Anstett | |
| 6,659,700 B1 | | 12/2003 | Farrell et al. | |
| 6,719,512 B2 | | 4/2004 | O'Banion et al. | |
| 6,817,818 B2 | | 11/2004 | Farrell et al. | |
| 6,905,299 B2 | | 6/2005 | Moores, Jr. | |
| 7,008,157 B2 | | 3/2006 | O'Banion et al. | |
| 7,014,407 B2 | * | 3/2006 | Crompton | F16B 15/08 |
| | | | | 206/343 |
| 7,014,408 B2 | | 3/2006 | O'Banion et al. | |
| 7,097,405 B2 | | 8/2006 | O'Banion et al. | |
| 7,165,710 B2 | | 1/2007 | O'Banion | |
| 7,882,994 B2 | | 2/2011 | Francescon | |
| 8,303,228 B2 | | 11/2012 | Gosis et al. | |
| 2004/0250504 A1 | | 12/2004 | Leek et al. | |
| 2005/0120541 A1 | | 6/2005 | O'Banion et al. | |
| 2006/0228192 A1 | | 10/2006 | Chang | |
| 2006/0254189 A1 | | 11/2006 | O'Banion et al. | |
| 2008/0063491 A1 | | 3/2008 | Ringl, Jr. | |
| 2008/0086979 A1 | | 4/2008 | O'Banion et al. | |
| 2008/0089760 A1 | | 4/2008 | Yao | |
| 2008/0131233 A1 | | 6/2008 | Yao | |

* cited by examiner

PLURAL TAPERED FASTENER WITH MATERIAL RECEIVING INWARD REGION

FIELD

The field relates to fasteners, and more specifically, to fasteners effective to penetrate dense material.

BACKGROUND

Engineered building materials are gaining acceptance in commercial and residential construction. Flooring elements in the form of flooring strips, planks and panels are increasingly being made of engineered materials. For example, engineered flooring elements such as those described above may be of a laminate construction comprising an engineered substrate with a veneer overlying the substrate. The veneer can provide the appearance of a solid wood flooring element or can provide any other design. The veneer may be of wood or another material.

The engineered substrate to which the veneer is laminated may be of a variety of different materials. Two representative examples of engineered materials utilized as a flooring element substrate are medium-density fiberboard (MDF) and high-density fiberboard (HDF). MDF is a generic term which refers to engineered wood products made of wood fibers combined with a binder system and formed under high pressure and temperature into panels. HDF is a generic term which refers to engineered wood products which are denser and stronger than MDF. HDF material may be made of highly compressed exploded wood fibers and resin to yield the dense finished product after high temperature and pressure forming.

The density of MDF is typically between about 31 to 62 lbs/ft$^3$ with the actual density being influenced by the density of the fiber used to manufacture the MDF panel. HDF density is typically between about 50 to about 65 lbs/ft$^3$ or greater.

Engineered flooring elements are frequently manufactured to have an interlocking or "snap fit" connection between adjacent flooring elements. The connection is provided at a joint formed by a male tongue and a female groove on opposite sides of the substrate portion of the flooring element. The male and female tongue-and-groove elements are keyed to fit together and to provide the interlocking connection.

The engineered flooring elements including a laminate of a veneer and a dense substrate tend to be relatively thin, generally having a thickness ranging from 0.312 inch to 0.625 inch. Such thickness is less than a typical natural hardwood flooring element which is generally about 0.750 inch thick. Flooring elements are provided in a variety of widths with flooring elements having a width of about 5 inches or greater being referred to as "planks" while flooring elements with a width of 5 inches or less are typically referred to as "strips." Engineered flooring element planks and strips are offered in the above-mentioned thickness range.

Flooring elements are most typically arranged on, and are secured to, a subfloor. A subfloor is a planar surface typically consisting of plywood or the like. It is highly preferred that the flooring elements are secured to the subfloor by mechanical fasteners such as cleats, nails or staples. Mechanical fasteners are preferred because such fasteners can be driven very quickly and easily using a fastener-driving tool. An entire flooring element can be secured to the subfloor in seconds using mechanical fasteners. Mechanical fasteners are also desirable because they are economical and have no negative environmental impact.

In a "blind" fastening process, a mechanical fastener is driven at an angle into a side surface of the flooring element. The fastener is completely hidden from view when the adjacent flooring element is fitted against the secured flooring element This leaves only the top surface of the flooring element viewable after the installation. In a "surface" fastening process (i.e., face nailing), the mechanical fastener is driven through the top surface of the flooring element and into the subfloor. The driven end of the fastener can be on the surface of the flooring element or can be countersunk into the flooring element.

A disadvantage of engineered flooring element materials, particularly those including a laminate of a veneer over a dense substrate portion, is that it is difficult to drive a mechanical fastener into and through the flooring element. This is because the high density of the flooring element material provides significant resistance to movement of the fastener. The dense substrate portion does not yield easily to the mechanical fastener. In contrast, natural wood receives a mechanical fastener easily because natural wood tends to collapse at the cellular level enabling the mechanical fastener to penetrate the wood. The engineered flooring element material must actually be displaced away from the mechanical fastener because it does not collapse as does the natural wood.

Problems arise when the dense material of the engineered flooring element substrate is displaced away from the mechanical fastener. More specifically, the displaced material forms a raised or protruding blemish around the driven end of the mechanical fastener. In the blind fastening process, these raised blemishes are formed in the side of the flooring element and can interfere with the interconnection of the adjacent flooring elements at the interlocking connection between adjacent flooring elements. This is a particular problem for "snap fit" type flooring elements because the joints are engineered with close tolerances.

In addition, the displaced material can lift the veneer adjacent the mechanical fastener creating a series of bump-type raised protrusions or blemishes in the veneer. These protrusions are very apparent and are considered to be unattractive, rendering the flooring element defective. In the surface nailing process, the material displaced from around the mechanical fastener becomes a raised and undesirable blemish in the veneer which detracts from the appearance of the flooring element.

Still another problem associated with driving a mechanical fastener into a dense engineered flooring element is that the fastener will frequently not penetrate fully into the flooring element because of the high density of the flooring element material. Even relatively thin engineered flooring elements can be very dense making complete fastener driving difficult. Partial driving of the fastener into the flooring element would leave the fastener projecting above the flooring element after driving. A separate labor-intensive countersinking step is required to manually set the fastener fully within the flooring element.

An undesirable solution to partial driving of the fastener into the flooring element is to increase the amount of force used to drive the fastener into the dense engineered flooring element. Mechanical fasteners are frequently driven with a pneumatic fastener-driving tool. If more force is required to drive the mechanical fastener into a dense engineered flooring element, then a corresponding increase in the air pressure used to power the pneumatic fastener-driving tool must be provided. For typical trigger-actuated fastener-driving tools routinely used by the flooring trade, the increase in air pressure required can be as much as 100% greater than the air pressure required to drive a mechanical fastener into natural wood (e.g., 50-60 psi for natural wood as compared with 100 psi for engineered material). Any increase in needed air pressure causes excessive wear on the air compressor unit, air fittings and fastener-driving tool increasing costs to the flooring installer.

Even if sufficient force is applied to drive the fastener, the fastener itself can fail when it is driven into the dense engineered flooring element. For example, the shank and head of the fastener can fatigue and bend when the head contacts the dense substrate material. Put another way, the fastener, rather than the flooring element material, yields when the fastener is driven. Bending of the fastener can cause the fastener and/or the head to protrude above the surface of the flooring element thus requiring the separate and labor-intensive countersinking step or removal of the fastener.

Possibly as a consequence of the aforementioned problems, manufacturers of engineered flooring elements of the types described above recommend that the flooring elements be secured to the subfloor or other surface by means of adhesive. Adhesives, however, are not optimally advantageous because adhesives require an inconvenient and time-consuming application step, require time to cure, are costly, and can be environmentally unfriendly because adhesives can contain, for example, volatile organic compounds. For a flooring installer, time is money and adhesives are less advantageous than mechanical fasteners in most flooring element applications.

As an alternative to adhesive, certain engineered flooring elements can be installed as a "floating" floor. In a floating floor, the flooring material simply rests on a cushion overlying the subfloor. The flooring elements are not mechanically attached to the subfloor. Floating floors, however, are not optimally advantageous because the flooring elements can move and feel less stable and secure when walked upon.

It would be an improvement in the art to provide an improved mechanical fastener which could be used to secure dense engineered building materials, such as flooring elements, to a subfloor or other surface, which would minimize blemish formation around the driven fastener, which would be robust, which would minimize wear on the fastener-driving tools, which would be efficient and economical to use and which would generally improve the installation of dense engineered building materials.

SUMMARY

Fasteners with plural tapers and with a material receiving inward region are described herein. Fasteners as described herein are robust and may be driven into any type of workpiece but have particular utility in penetrating and securing a workpiece of a high density material, such as medium density fiberboard and high density fiberboard. Such securement occurs without blemishing of the dense workpiece. One potential application for such fasteners is to secure engineered flooring elements of a dense material to a subfloor. In such applications, the fasteners can be used as a replacement for adhesive-type securing systems or can be used to secure floating floor systems making those systems much more solid and attractive to the consumer.

In an embodiment, a fastener may comprise a substantially flat drivable unitary fastener with a head and a shank which extends from the head. In such embodiment, the shank defines an axis and has a first portion and a second portion. The shank first portion may terminate at a tip and the second portion may be adjacent to the head. Barbs may be provided along the shank first portion to better secure the fastener to the flooring element, subfloor or other workpiece. The barbs may be along first and second opposite edges of the fastener.

A head embodiment for the fastener may include an upper striking edge substantially perpendicular to the axis. A head projection may extend from a proximal end at the shank in a direction substantially perpendicular to, and away from, the axis to a distal end remote from the axis.

The fastener embodiments include plural tapers which provide for improved penetration of a workpiece, particularly a workpiece of a dense material, while providing the opportunity to minimize raised blemishes on the workpiece. A first taper of the plural tapers may be provided in the shank. In such an embodiment, the shank may be continuously tapered axially inwardly along a second portion of the shank from the first portion of the shank to the head. The shank taper may be axial, curved, and/or combinations of axial and curved portions. In embodiments, it is preferred that the shank taper not narrow the shank by more than half the maximum width of the shank so as to maintain integrity of the fastener. The taper in the shank defines a material-receiving tapered inward region adjacent to the shank. Workpiece material can be displaced into the inward region resulting from the shank taper to minimize or avoid pushing workpiece material up and around the fastener causing raised blemishes.

Another of the plural tapers may be provided in the head. In such an embodiment, the head projection may have a lower leading edge continuously tapered between a distal end of the head projection and the second portion of the shank. The tapering of the head projection provided by the leading edge may be in various forms, such as a convex taper, a concave taper or combinations of tapers. In such an arrangement, the axially-parallel dimension of the head projection progressively increases from the distal end of the head projection to the proximal end of the head projection. The tapered leading edge enables the head to more easily penetrate a workpiece without substantial bending of the head projection.

Fasteners may be provided as separate fasteners. In other embodiments, the fasteners may be arranged in a stick of joined-together fasteners. This latter arrangement of a fastener stick facilitates loading of the fasteners in a magazine of a type used to feed fasteners to a driver of a pneumatic, electric, ratchet or plunger-type fastener-driving tool. Such fastener-driving tools drive fasteners one-after-the-other from the stick loaded in the magazine.

Other aspects and embodiments of the fasteners are described and illustrated herein.

BRIEF DESCRIPTION OF THE DRAWINGS

Exemplary plural tapered fasteners with a material receiving inward region may be understood by reference to the following description taken in conjunction with the accompanying drawings, in which like reference numerals identify like elements throughout the different views. The drawings are not necessarily to scale, emphasis instead being placed upon illustrating the principles of the invention. The drawings depict only embodiments of the invention and are not therefore to be considered as limiting the scope of the invention. In the accompanying drawings.

DETAILED DESCRIPTION

Before describing examples of mechanical fasteners 210, 310 according to the invention, there will first be provided a description of two types of prior art mechanical fasteners 10, 110 illustrated in FIGS. 1-4. Fasteners 10, 110 are commonly referred to as an L-type cleat or nail.

Referring then to FIGS. 1-4, each fastener 10, 110 includes a unitary body 11, 111 including a head 13, 113 and shank 15, 115. Each fastener 10, 110 has two substantially planar side walls 17, 19, 117, 119, two edges 21, 23, 121, 123 and a pointed tip 25, 125 at a distal end 27, 127 of fastener 10, 110 opposite head 13, 113. A plurality of barbs 29, 129 are provided in edges 21, 23, 121, 123. Longitudinal axis 31, 131 extends lengthwise through shank 15, 115 and head 13, 113.

Figure 1:
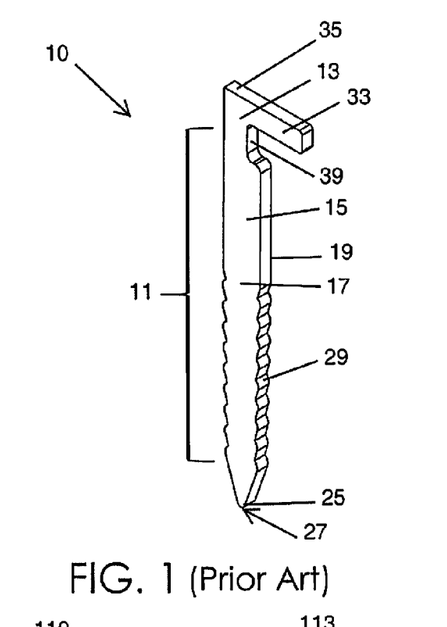
FIG. 1 is a perspective view of a prior art L-type cleat.
Figure 2:
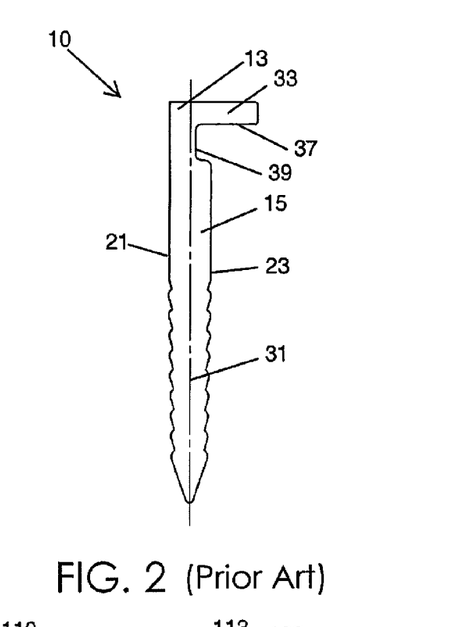
FIG. 2 is a side elevation view of the cleat of FIG. 1.
Figure 3:
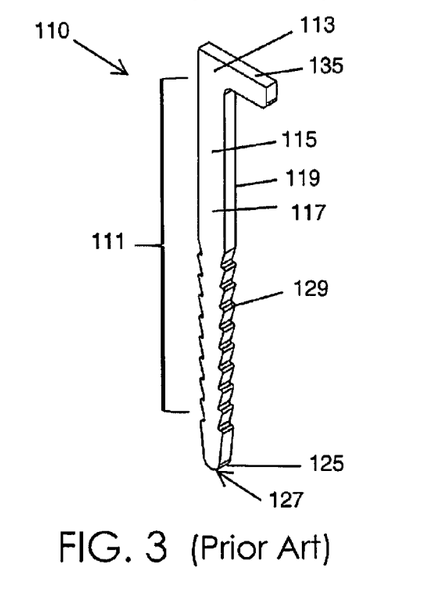
FIG. 3 is a perspective view of a further prior art L-type cleat.
Figure 4:
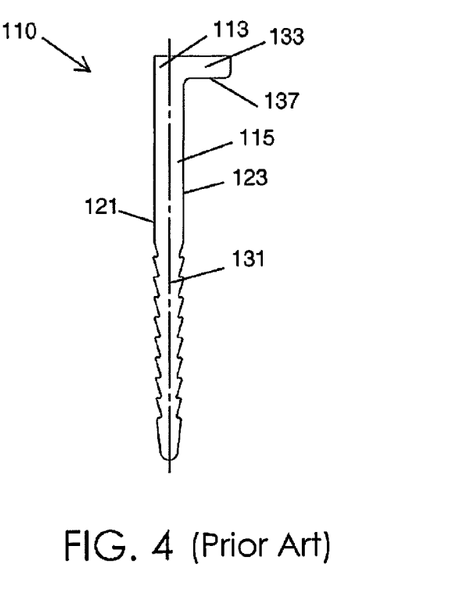
FIG. 4 is a side elevation view of the cleat of FIG. 3.
Figure 5:
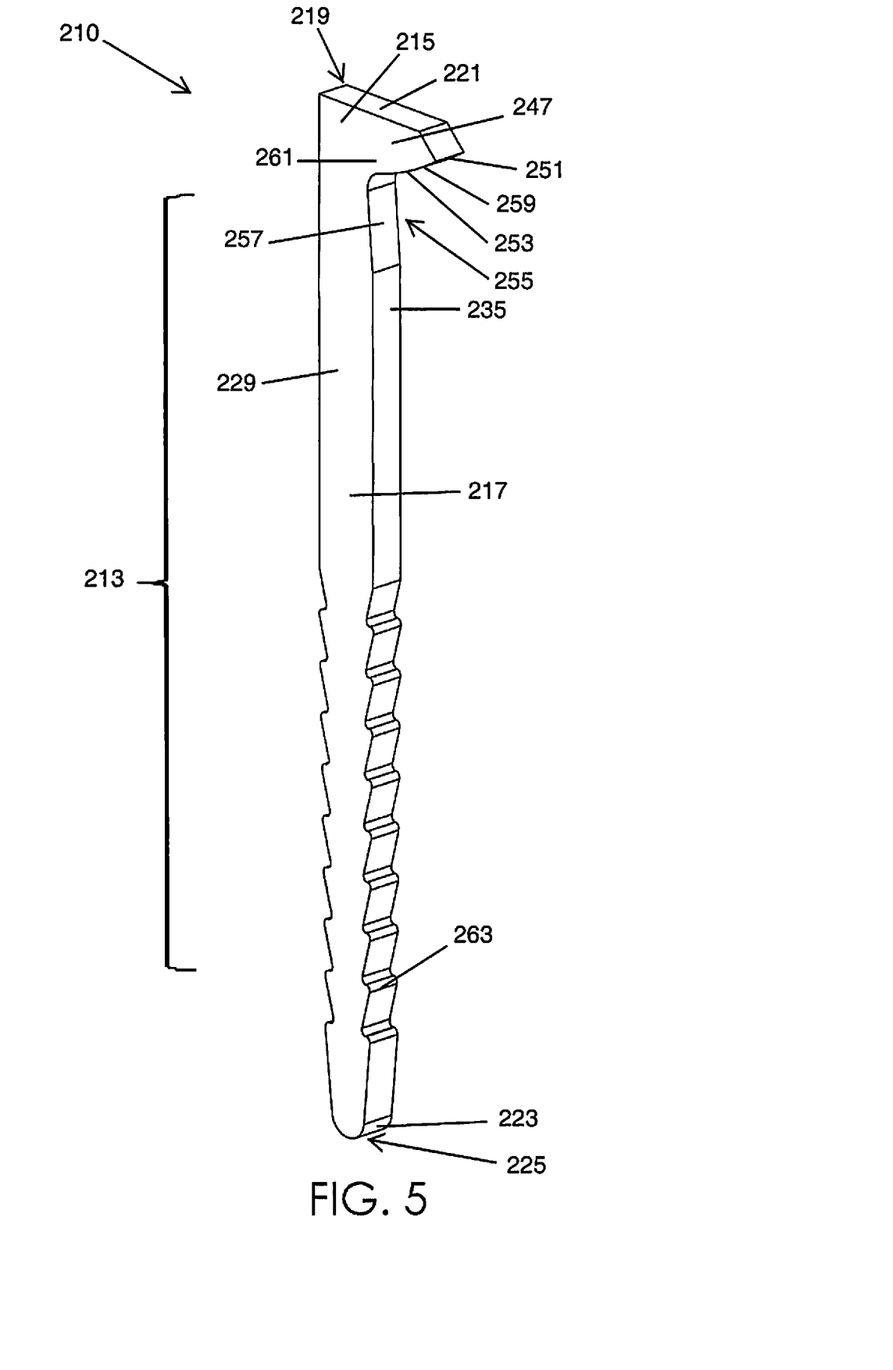
FIG. 5 is a perspective view of a mechanical fastener embodiment according to the invention.

Referring further to FIGS. 1-4, head 13, 113 includes a head projection 33, 133, which extends out laterally from shank 15, 115 edge 23, 123 at a right angle to axis 31, 131 (i.e., normal to shank 15, 115) providing a generally L-shaped appearance in a side elevation view such as in FIGS. 2 and 4. Striking edge 35, 135 and lower edge 37, 137 of head projection 33, 133 are perpendicular (i.e., normal) to axis 31, 131 which, with edges 21, 23, 121, 123 along head projection 33, 133 providing each head 13, 113 with a rectangular appearance when viewed in a side elevation such as FIGS. 2 and 4. Fasteners 10, 110 are typically stamped or blanked from cold rolled steel sheets.

Fastener 10 differs from fastener 110 in that fastener 10 includes a score 39. Displaced flooring material can expand into score 39 once fastener 10 is driven into a workpiece, such as a flooring element plank or strip. If fastener 10 is not fully driven into the flooring material, then head 13 could be removed with pliers by breaking shank 11 where it narrows adjacent score 39. Such head 13 removal is labor-intensive and time consuming, especially if many heads 13 must be removed, for example, from a flooring installation.

While completely satisfactory for their intended purposes, fasteners 10, 110 are not fully satisfactory for use with dense engineered materials such as MDF and HDF because they do not optimally penetrate such high-density material as described herein. Therefore, fasteners 10, 110 would not be satisfactory for use with flooring elements, such as flooring planks and strips, which are increasingly being manufactured of high-density materials such as MDF and HDF as an alternative to natural wood.

Figure 10:
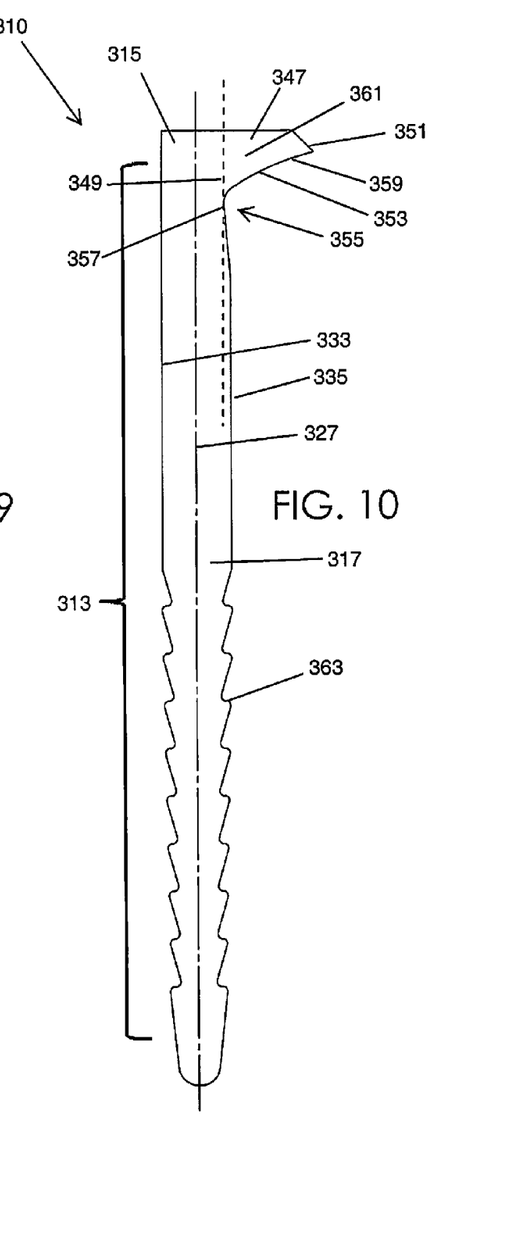
FIG. 10 is a side elevation view of the fastener embodiment of FIG. 9.
Figure 11:
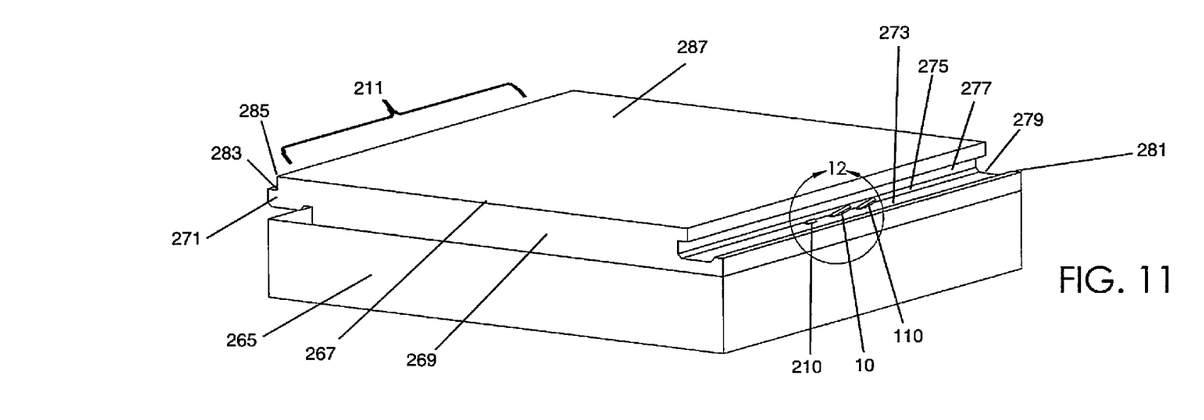
FIG. 11 is a perspective view schematically illustrating a fastener embodiment according to FIGS. 5-6 and the prior art L-type cleats of FIGS. 1-4 driven into a dense engineered flooring element in a blind fastener-driving process.
Figure 12:
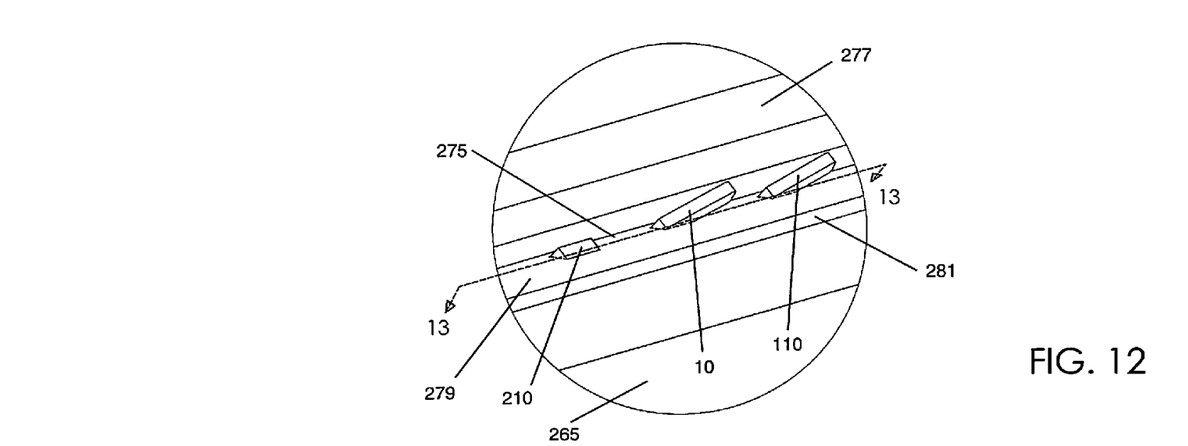
FIG. 12 is an enlarged perspective view of reference section 12 of FIG. 11.
Figure 13:
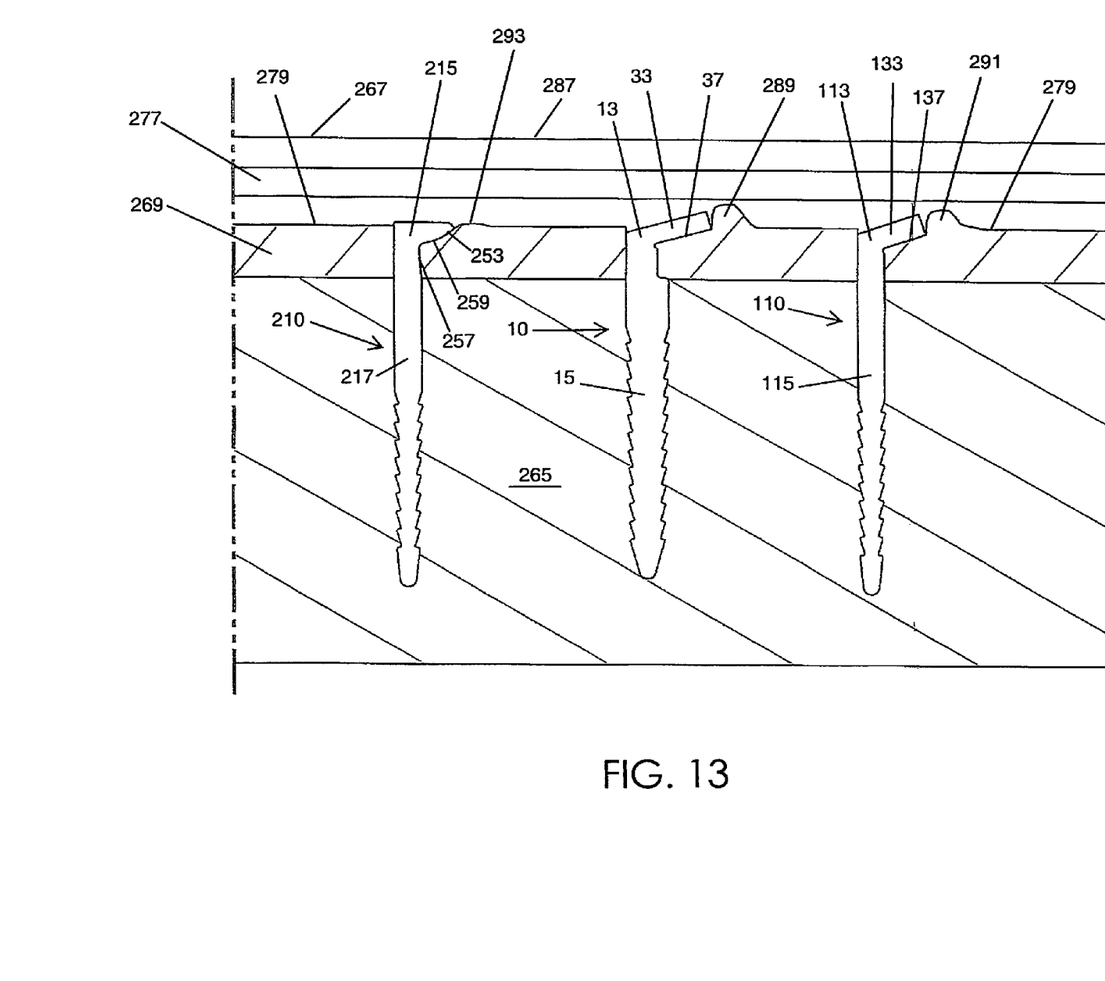
FIG. 13 is a section view taken along section 13-13 of FIG. 12.
Figure 16:
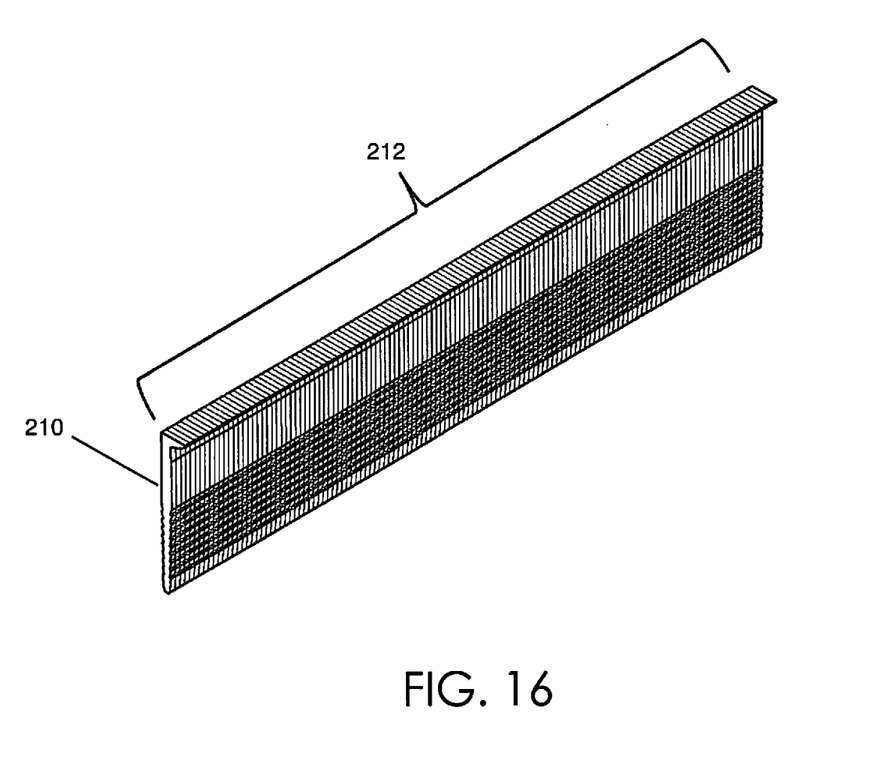
FIG. 16 illustrates a stick of fasteners.

Referring now to FIGS. 5-10, there are shown first and second embodiments of a mechanical fastener 210, 310 with plural tapers and a material receiving inward region according to the invention. For convenience and brevity, fasteners 210 and 310 are described together. Fasteners 210, 310 are commonly referred to as cleats or nails. Fasteners 210, 310 are engineered to be driven into a workpiece of a dense engineered material, such as a laminate tongue-and-groove flooring element 211 (FIGS. 11-13). Flooring element 211 may be in the form of a plank, a strip or another suitable form. Examples of dense engineered material include MDF and HDF materials of the types described previously. Fasteners 210, 310 may be stamped or blanked from cold rolled steel sheets or other material, such as stainless steel. Fasteners 210, 310 can be formed into sticks 212 (FIG. 16) or strips for continuous magazine feeding by a fastener-driving tool, such as a pneumatic, electric, ratchet or plunger-type fastener-driving tool.

In the examples, each fastener 210, 310 may be stamped or blanked to provide a unitary one-piece fastener. Fastener 210, 310 may have a unitary body 213, 313 including a head 215, 315 and a shank 217, 317 connected to and extending from head 215, 315. Head 215, 315 includes a striking end 219, 319 with an upper and planar striking edge 221, 321 suitable for striking, and thus driving, fastener 210, 310 into a workpiece, such as a flooring element 211 or the like. Shank 217, 317 terminates at a pointed tip 223, 323 provided to penetrate a workpiece (e.g., a flooring element 211). Tip 223, 323 is at an end 225, 325 of body 213, 313 opposite head 217, 317 striking end 219, 319. Shank 217, 317 further defines a longitudinal axis 227, 327 extending lengthwise through shank 217, 317 and head 215, 315 from tip 223, 323 to striking edge 221, 321. Shank 217, 317 may be symmetrical about axis 227, 327. In the examples, striking edge 221, 321 is substantially perpendicular to axis 227, 327.

In the examples, a pair of substantially planar side walls 229, 231 and 329, 331 and a pair of first and second edges 233, 235 and 333, 335 are provided along body 213, 313 from striking end 219, 319 of head 215, 315 to end 225, 325 of fastener 210, 310 opposite head 215, 315. Planar side walls 229 and 231 and planar side walls 329 and 331 are on opposite sides of body 213, 313 as are first and second edges 233 and 235 and 333 and 335 in the examples. In the examples, shank 217, 317 has a first portion 237, 337 terminating at tip 223, 323 and a second portion 239, 339 that extends from first portion 237, 337 to head 217, 317.

Shank 217, 317 first portion 237, 337 and second portion 239, 339 between planar side walls 229, 231 and 329, 331 may be rectangular in cross-section (with first and second edges 233, 235, 333, 335 substantially perpendicular to side walls 229, 231 and 329, 331 in the examples) providing a generally uniform cross-sectional thickness between side walls 229, 231 and 329, 331. Such planar side walls 229, 231 and 329, 331 define a fastener 210, 310 which is generally considered to be flat. It is not required that fastener 210, 310 is flat because non-flat configurations, such as tapered configurations, may be implemented.

In the examples, first portion 237, 337 of shank 217, 317 includes a tapered segment 241, 341 toward tip 223, 323 and a non-tapered segment 243, 343. Tapered segment 241, 341 of first portion 237, 337 of shank 217, 317 narrows shank 217, 317 toward tip 223, 323 for penetration into a workpiece such as flooring element 211. First and second edges 233, 235 and 333, 335, in the tapered segment 241, 341 may optionally include serrations in the form of opposed pairs of barbs, one of which is indicated by reference number 245, 345. First and second edges 233, 235 and 333, 335 in non-tapered segment 243, 343 may optionally be substantially parallel and coplanar.

The non-tapered segment 243, 343, of first portion 237, 337 of shank 217, 317 may have first and second edges 233, 335 which are axial and parallel. First edge 233, 333 may be axial to and including striking end 219, 319.

Figure 6:
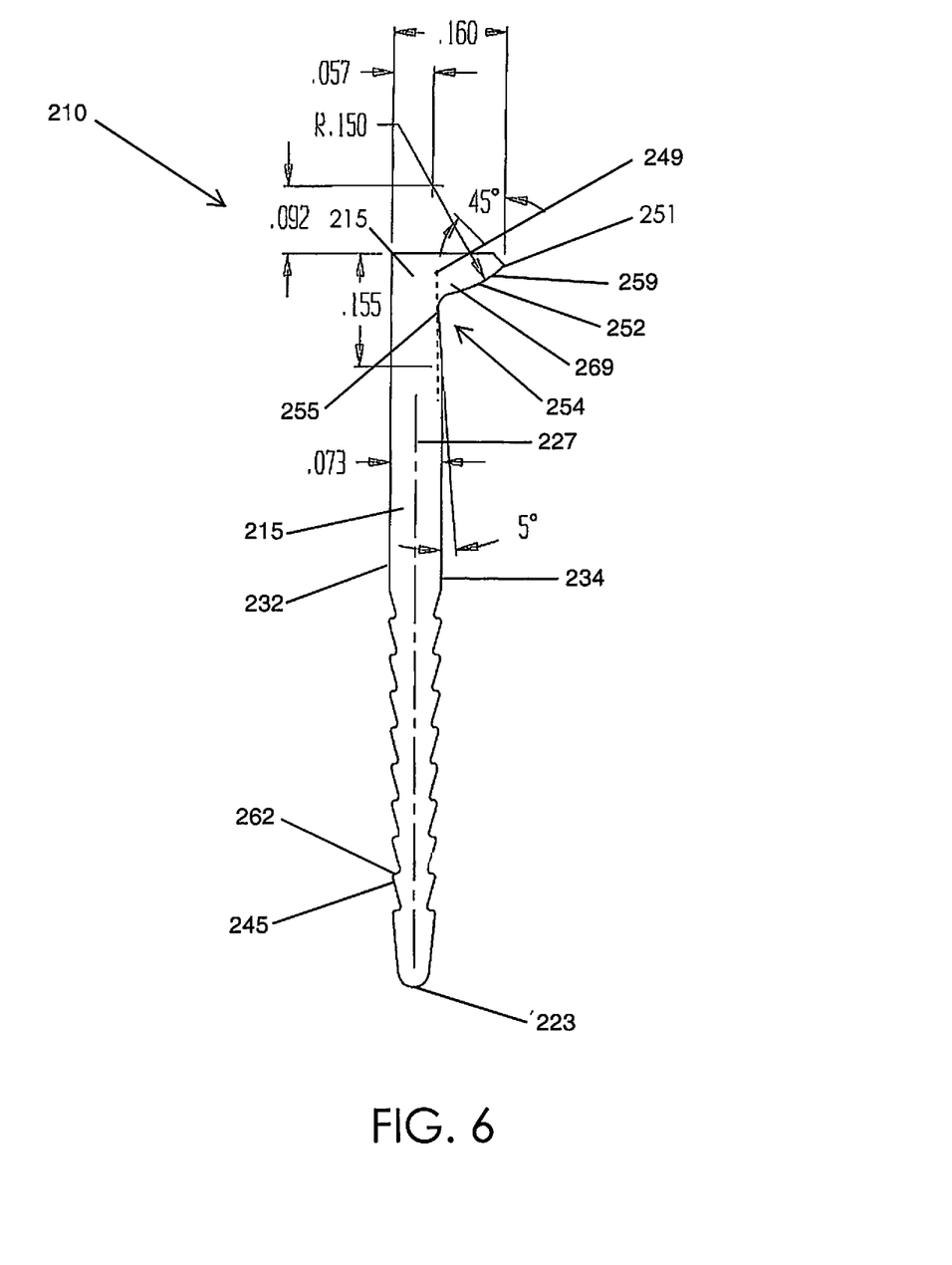
FIG. 6 is a side elevation view of the fastener embodiment of FIG. 5 with superimposed dimensions provided as non-limiting examples.
Figures 7, 8:
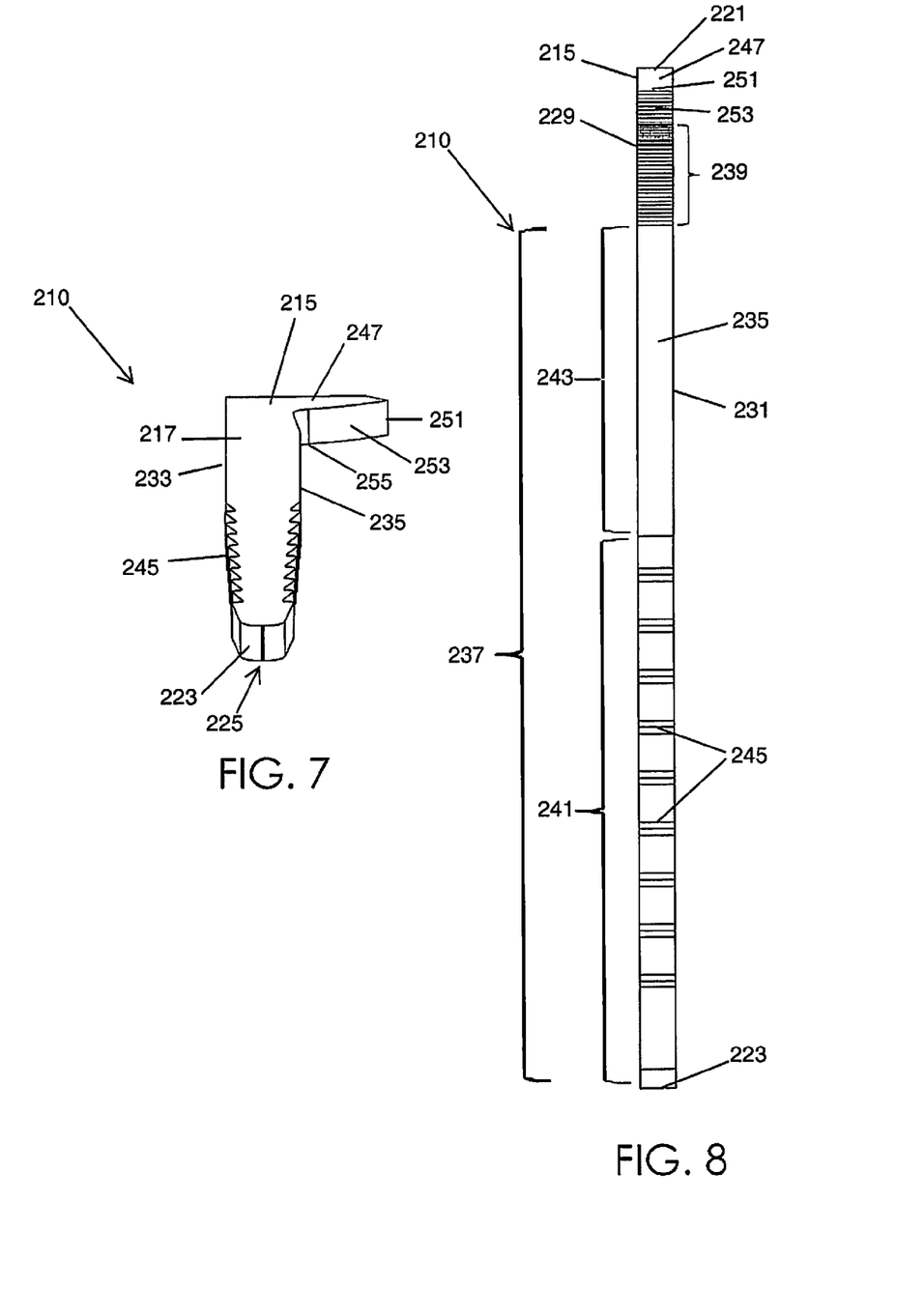
FIG. 7 is a tip end perspective view of the fastener embodiment of FIG. 5.
FIG. 8 is a further side elevation view of the fastener embodiment of FIG. 5.
Figure 9:
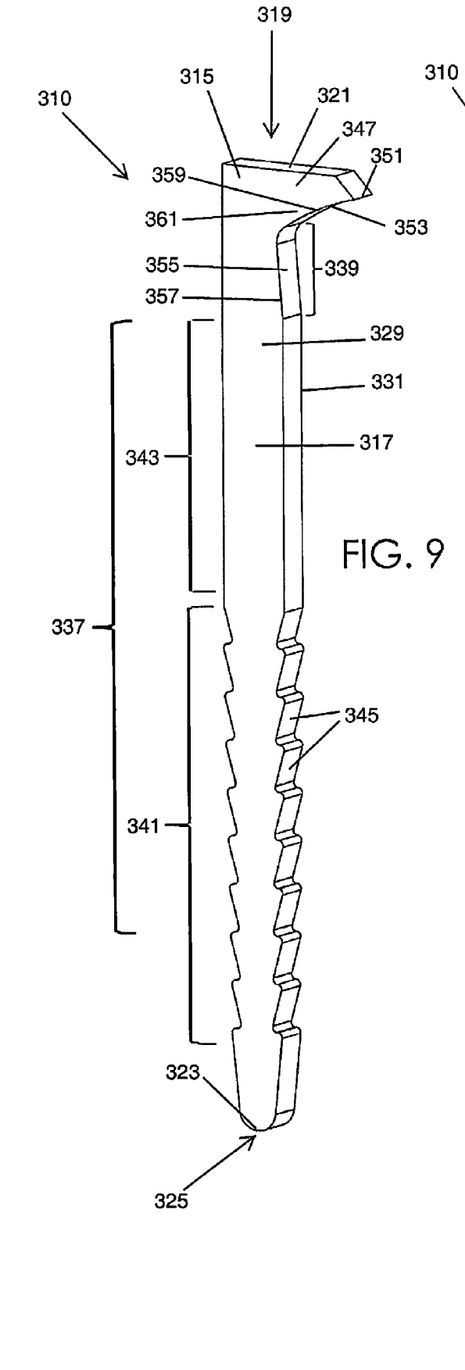
FIG. 9 is a perspective view of a further mechanical fastener embodiment according to the invention.

In the examples, head 215, 315 includes a head projection 247, 347 extending from a proximal end 249, 349 in a direction substantially perpendicular to, and away from, axis 227, 327 to a distal end 251, 351 furthest from axis 227, 327. In the examples, projection 247, 347 is along second edge 235, 335 of body 213, 313 very generally providing an L-shaped appearance in a side elevation view such as in FIGS. 6 and 10. Second edge 235, 335 defining head projection 247, 347 between distal end 245, 345 of head projection 247, 347 and shank 215, 315 is referred to herein as a lower leading edge 253, 353 for reasons described below. As illustrated in the examples of FIGS. 6 and 10, proximal end 249, 349 of head projection is indicated by the imaginary boundary line tangent to a point where leading edge 253, 353 and second edge 235, 335 of shank 215, 315 meet. Head projection 247, 347 provides fastener 210, 310 with holding power when driven into flooring element 211.

In the examples, shank 215, 315 and head 217, 317 include structure enabling fastener 210, 310 to penetrate an engineered workpiece of a dense material, such as flooring element 211, without failure of the fastener 210, 310 and with minimal or no damage to the workpiece around fastener 210, 310. Such structure may include a material receiving tapered inward region 255, 355 defined by at least a first taper along second edge 235, 335 of shank second portion 239, 349 and robust tapered head projection 247, 347 defined by at least a second taper along leading edge 253, 353.

Inward region 255, 355 is provided to receive displaced dense engineered material of the workpiece (e.g., flooring element 211) when fastener 210, 310 is driven, while the robust head projection 247, 347 structure ensures that head 215, 315 penetrates the workpiece without bending of body 213, 313. Bending of body 213, 313 could cause head 215, 315, especially head projection 247, 347, to undesirably project out from the workpiece (e.g., flooring element 211) thereby requiring either a time consuming and labor intensive countersinking step to fully drive the fastener 210, 310 into the workpiece or removal of the fastener 210, 310 entirely from the workpiece.

In the examples, inward region 255, 355 of shank 215, 315 provides a type of void space in fastener 210, 310 defined by second edge 235, 335. More specifically, second edge 235, 335 tapers continuously inwardly along and toward axis 227 from the start of shank second portion 239, 339 (i.e., the end of shank first portion 237, 327) toward head 217, 317 and away from tip 223, 323 to leading edge 253, 353. Second edge 235, 335 defines a shank taper 257, 357 along which the cross sectional area of shank 217, 317 is narrowed between first and second edges 233, 235 and 333, 335 toward head 215, 315.

To maintain mechanical integrity, it is preferred that shank taper 257, 357 narrows shank 217, 317 between first and second edges 233, 235 and 333, 335 so that the width of shank 217, 317 between first and second edges 233, 235 and 333, 335 is not less than half the maximum width between first and second edges 233, 235 and 333, 335 in first portion 237, 337 of shank 217, 317. In embodiments such as illustrated in FIG. 6, a shank taper 257, 357 narrowing shank 215, 315 about 0.016 inch may be implemented. Inward region 255, 355 represents the volume of space provided in fastener 210, 310 by shank taper 257, 357 into which workpiece material may flow. In other embodiments, a further shank taper could be provided in first edge 233, 333, for example as a mirror image of shank taper 257, 357 in second edge 235, 335.

Second edge 235, 335 defining shank taper 257, 357 may have a linear (i.e., axial) portion as illustrated in FIGS. 5-6 and 9-10 or may be of another narrowing configuration, such as a curve or combinations of axial and curved portions. Tapering is continuous in the sense that body 213, 313 is wider at the start of shank second portion 239, 339 than where leading edge 253, 353 meets second edge 235, 335 defining shank taper 257, 357. In the non-limiting fastener embodiments 210, 310, second edge 235, 335 forming shank taper 257, 357 may be at an angle of about 5° relative to second edge 235, 335 of first portion 237, 337 of shank 217, 317 as illustrated in FIG. 6. Other angles and tapered relationships may be implemented. By way of example only, it has been found that an angle in a range of about 3° to about 10° provides for an adequate inward region 255, 255 while also not compromising the mechanical integrity of fastener 210, 310.

Also in the examples, head 215, 315 and the preferred robust tapered structure of head projection 247, 347, strengthens fasteners 210, 310 while contributing to more complete penetration of fastener 210, 310 into an engineered workpiece of a dense material (e.g., flooring element 211) with less force than would be required for fasteners 10, 110. In addition, head projection 247, 347 serves to grip and hold the workpiece (e.g., flooring element 211) to the surface, such as a subfloor, to which it is fastened. In the examples, leading edge 253, 353 is considered lower because it is toward tip 223, 323 which penetrates the workpiece.

In the examples, leading edge 253, 255 extends from distal end 251, 351 of head projection 247, 347 toward shank 217, 317 to meet with shank taper 257, 357 and is continuously tapered between distal end 251, 351 and second portion 239, 339 of shank 217, 317. Leading edge 253, 353 defines a head taper 259, 359 as illustrated, for example, in FIGS. 5-10. In the examples, the nature of the head taper 259, 359 is such that the dimension of head projection 247, 347 axially parallel to axis 227, 327 progressively increases from distal end 251, 351 of the head projection 247, 247 to proximal end 249, 349 of the head projection 247, 347. Considered another way, the dimension of head projection 247, 347 axially parallel to axis 227, 327 progressively narrows toward distal end 251, 351 of head projection 247, 347. This arrangement provides for continuous tapering of head projection 247, 347 along leading edge 253, 353 between distal end 251, 351 and second portion 239, 339 of shank 217, 317 where leading edge 253, 253 meets second edge 235, 335 defining shank taper 255, 355. This progressive increase of head projection 247, 347 axially parallel to axis 227, 327 also strengthens head projection 247, 347 as described below.

Leading edge 253, 353 may meet shank taper 257, 357 inward of second edge 235 of shank first portion 239, 339. In the examples, the shank and head tapers 257, 259 provide plural tapers which define inward region 255, 355. In such embodiments, inward region 255, 355 provides a space within body 213, 313 to receive material displaced from flooring element 211, or another workpiece, during driving. Head taper 259, 359 leading edge 253, 353 serves as a type of inclined surface which, like an inclined plane of a cutting tool, more easily penetrates flooring element 211 than do heads 13, 113 of fasteners 10, 110 which have no head taper and are normal to shank 11, 111 and respective axis 31, 131. Ease of fastener 210, 310 penetration is important when the workpiece is of a high density material such as MDF or HDF. Less force is required to drive fasteners 210, 310 fully into a flooring element 211 or other workpiece because of the tapered leading edge 253, 353. In contrast, the non-tapered lower edges 37, 137 of fasteners 10, 110 are essentially parallel to flooring element 211 or another workpiece when driven, thereby creating resistance to penetration of fastener 10, 110 into the flooring element 211 or other workpiece and requiring relatively more force to drive the fastener 10, 110 fully into the workpiece.

Fastener 210, 310 head 215, 315 integrity and strength are improved because head projection 247, 347 includes extra body 213, 313 material providing a gusset-like reinforcement portion 261, 361 spanning between head 215, 315 and shank 217, 317 to reinforce body 213, 313. Gusset-like reinforcement portion 261, 361 is provided as the dimension of head portion 247, 347 axially parallel to axis 227, 327 progressively increases from distal end 251, 351 of the head projection 247, 347 to the proximal end 249, 349 of the head projection 247, 347. The gusset-like reinforcement portion 261, 361 prevents head projection 247, 347 from bending when penetrating into a high-density material such as MDF or HDF.

The aforementioned arrangement enables head projection 247, 347 to have an adequate striking edge 221, 321 for driving and yet have less surface area when viewed in a side elevation as compared to projections 33, 133 of fasteners 10, 110. For example, head projection 247, 347 may have an area along side wall 229, 329 which is about 15% to about 30% less than the area of projections 33, 133 along side wall 17, 117. The relatively smaller area of head projection 247, 347 as compared to projection 33, 133 of fasteners 10, 110 results in less displacement of flooring element 211 material or other workpiece material thereby reducing the force required to drive fasteners 210, 310 compared to fasteners 10, 110 and reducing blemishing of flooring element 211 or another workpiece as a result of fastener driving.

In the non-limiting fastener embodiment 210, leading edge 253 forming head taper 259 may protrude outwardly from head portion 241. For example and as illustrated in the example of FIG. 6, leading edge 253 defines a convex protrusion having a radius of about 0.150 inch. Radii of about 0.100 inch to about 0.300 inch may be implemented for leading edge 253 in other iterations. Leading edge 253 may have a second radius where it meets shank taper 257 of about 0.10 inch to about 0.05 inch. In the non-limiting example of FIG. 6, the second radius of leading edge 253 has a radius of about 0.20 inch.

Other angles and tapered relationships may be implemented. For example, the fastener embodiment of FIGS. 9-10 leading edge 353 forming head taper 359 may protrude inwardly toward shank 217, 317 to the meeting with shank taper 357. In such embodiment, leading edge 353 defines a concave inward region having a radius of about 0.100 to about 0.300 inch.

Like shank taper 257, 357, head taper 259, 359 may be of other continuously narrowing configurations such as an axial segment or segments and/or combinations of axial and curved configurations.

In the examples, therefore, it has been found that the combination of the shank taper 257, 357 and head taper 259, 359 and the inward region 255, 355 defined by such tapers 257, 259 and 357, 359 provide a type of pocket, recess, or void in fastener 210, 310 which can receive dense engineered material of flooring element 211 or other workpiece material displaced as fastener 210, 310 is driven. This inward region 255, 355 limits blemishing of flooring element 211 as described herein. It has also been found that gusset-like reinforcement portion 261, 361 spanning between head 215, 315 and shank 217, 317 of body 213, 313 strengthens body 213, 313 preventing fastener 210, 310 bending during driving while leading edge 253, 353 reduces force required to penetrate flooring element 211 or other workpiece.

As described previously, at the end of shank 217, 317 opposite head 215, 315 is a tip 223, 323 that penetrates a workpiece, such as flooring element 211. Tip 223, 323 is at the end of tapered segment 239, 339 which may also include a plurality of outwardly extending barbs 245, 345 on at least one of first or second edge 233 or 235, 333 or 335 of shank 217, 317. In the examples of FIGS. 5-10, barbs 245, 345 are positioned along each of first and second edge 233, 235 and 333, 335 of shank first portion 237, 337, thereby defining barb 245, 345 pairs. The spacing between upper barb pairs 245, 345 closer to head 215, 315 is greater than the spacing between barb pairs 245, 345 closest to tip 223, 323. As a result, a gradual and uniform taper is defined from the upper barb pair 245, 345 through the lowermost barb pair 245, 345. Barb back edges 263, 363 bite into subfloor 265 providing a more secure fastening of a flooring element 211 to subfloor 259.

A fastener 210, 310 having a body length of approximately 1.443 inches between ends 219, 225 and 319, 325 may have a thickness between planar side walls 229, 231 and 329, 331 of about 0.035 to about 0.62 inch, although other thicknesses may be utilized. In other embodiments, a thickness of about 0.050 inch may be implemented for fasteners 210, 310 of about 1 inch to about 1.750 inches in length and a thickness of about 0.062 inch may be implemented for a fastener of about 1.5 inches to about 2 inches. Other fastener lengths, such as 0.750 inch, may be implemented with an appropriate thickness.

Shank 217, 317 may have a maximum width between first and second edges 233, 235 and 333, 335 of about 0.073 inch to about 0.125 inch.

Head 215, 315 may have a width of about 0.160 inch between first edge 233, 333 and distal end 251, 351 of head projection 247, 347 while head projection 247, 347 may have a width between head projection proximal 249, 349 and distal end 251, 351 of about 0.103 inch to about 0.150 inch. It is to be understood that all dimensions provided herein are non-limiting examples.

As illustrated in FIGS. 11-15, fastener 210, 310 can be dimensioned to extend through flooring element 211 and into subfloor 265. Preferably, in such embodiments, shank first and second portions 237, 337 extend into flooring element 211. Further, shank tapered segment 241, 341 with barbs 245 and a portion of non-tapered portion 243, 343 are sunk into subfloor 265.

It has been found that reducing the thickness of fastener 210, 310 between side walls 229, 331 and 329, 331 with respect to that of conventional fasteners, in combination with inward region 255, 355 and the plural tapering provided by shank taper 257, 357 and head taper 259, 359 significantly reduces the volume of workpiece 211 displaced during fastener 210, 310 driving and reduces blemishing of flooring element 211 as described below.

Fastener 210, 310 is preferably used in a conventional fastener-driving tool (not shown) such as a pneumatic, electric, ratchet or plunger-type fastener-driving tool. As previously described, fasteners 210, 310 may be formed into sticks or strips for continuous magazine feeding by the fastener-driving tool.

Reference will now be made to FIGS. 11-15 to illustrate advantages provided by fasteners 210, 310 according to the invention, particularly in settings involving driving of a fastener 10, 110, 210, 310 into a workpiece which is of a dense engineered material, such as flooring element 211. Referring then to FIGS. 11-13, there is shown an engineered flooring element 211 including a laminate comprising a top veneer layer 267 overlying a dense engineered substrate 269. Veneer layer 267 may be of wood to provide the appearance that flooring element 211 is of a solid wood material. Veneer 267 may also be of another material, for example to provide flooring element 211 with a design or color component.

Substrate 269 may comprise a dense engineered material, examples of which are MDF and HDF as previously described. Also as previously described, the densities of these materials typically fall in a range depending on the specific material implemented with MDF having a density of between about 31 to about 62 lbs/ft$^3$ and HDF having a density of between about 50 to about 65 lbs/ft$^3$ or greater. Material densities other than those described above may be encountered in other iterations of a flooring element 211 or other workpiece.

In the examples, flooring element 211 is illustrated as an interlocking or "snap fit" type tongue-and-groove flooring element 211 designed to interconnect with adjacent flooring elements (not shown) to collectively provide a flooring surface. A male tongue 271 and a female groove 273 on opposite sides of substrate 269 are keyed to fit together with one of a corresponding male tongue or female groove (identical to male tongue 271 and female groove 273) of an adjacent flooring element (identical to flooring element 211) and to provide an interlocking connection between flooring elements (e.g., flooring element 211 and others). Male tongue 271 and female groove 273 may be milled, formed or otherwise provided in flooring element 211. Flooring element 211 including veneer 267 overlying substrate 269 may, for example, have a thickness ranging from about 0.3125 inch to about 0.625 inch. The veneer 267 may have a thickness of between about 0.03125 inch to about 0.25 inch.

As described previously, conventional flooring installation practice is to secure an engineered flooring element, such as flooring element 211, to subfloor 265 by means of adhesive. Alternatively, interlocked flooring elements 211 could be allowed to "float" without mechanical connection to subfloor 265. As described previously, adhesives are costly and inconvenient and floating floor systems do not have the "solid" feel that consumers want. Mechanical fasteners would be a superior alternative to adhesive and floating floor systems if mechanical fasteners could be fully driven into the flooring element 211 in a single driving step and without damaging (e.g., blemishing) the flooring element 211. This is at least in part because of the solid feel provided in the floor by mechanical fasteners.

FIGS. 11-13 schematically illustrate problems arising from use of conventional fasteners 10 and 110 and the solution provided by a fastener 210 according to the invention. Fasteners 10, 110 and 210 are illustrated in a blind fastening process for an engineered flooring element 211 having a substrate 269 which may be in the range of about 31 to about 65 lbs/ft$^3$ or greater, typical of MDF and HDF. FIGS. 11-13 schematically illustrate the three fasteners 10, 110, 210 driven into such an engineered dense substrate 269 of flooring element 211 in an identical manner, for example with a pneumatic fastener-driving tool (not shown) operated at a consistent 90 psi.

As illustrated in FIGS. 11-13, fasteners 10, 110, 210 have been driven into a pocket 275 of flooring element 211 at an approximate 45° angle. In the example, pocket 275 is a female pocket defined by upright side wall 277, bottom wall 279 and upright rib 281. Fasteners 10, 110, 210 are driven into the junction of side wall 277 and bottom wall 279. It is to be understood that fastener 210 could be driven into other portions of flooring element 211, for example into a pocket 283 formed by side wall 285 and male tongue 271 for a blind fastening process. Or, fastener 210 could be driven into a top surface 287 of flooring element 211 through veneer 267, for example in a surface fastening process (i.e., face nailing).

As described previously, it is an objective of the blind fastening process that fastener 10, 110, 210 is hidden from view after adjacent flooring elements 211 are interconnected. For the flooring elements (e.g., flooring element 211) to interconnect properly, it is important that the adjacent flooring elements 211 fully interconnect. Male tongue 271 and female groove 273 are engineered to have tight tolerances. In the flooring element 211 example of FIGS. 11-13, male tongue 271 must fit completely and securely into female groove 273 so that the male tongue and female groove 271, 273 are fully interlocked.

A defective flooring installation would result if male tongue 271 is unable to fit fully and securely into female groove 273. Defects resulting from incomplete interconnection of adjacent flooring elements can include: (1) irregular and non-uniform gaps between adjacent flooring elements 211, and (2) irregular raising of adjacent flooring elements 211 in which top surfaces (e.g. top surface 287) of adjacent flooring elements (e.g., flooring element 211) are not all in the same horizontal plane. Some or all of these defects create the appearance of an irregular and unattractive flooring surface.

Because of the difficulty of driving fasteners 10, 110 into dense material such as flooring element 211, FIGS. 11-13 illustrate fasteners 10 and 110 as being only partially driven into flooring element 211. FIGS. 11-13 schematically illustrate heads 13, 113 of fasteners 10, 110 projecting outwardly from the junction of side wall 277 and bottom wall 279 in a position which would block and thereby interfere with insertion of male tongue 271 into female groove 273, particularly if numerous fasteners 10, 110 were to protrude out from flooring element 211. FIG. 13 schematically illustrates heads 13, 113 protruding outwardly from flooring element 211 at least in part due to bending of heads 13, 113 caused by contact with the dense substrate 269. Interference with interconnection of adjacent flooring elements 211 would potentially render the flooring installation defective.

To eliminate a protruding head 13, 113, it would be necessary to manually countersink the head 13, 113 with a punch and hammer or to remove the fastener 10, 110. Such countersinking or fastener removal is a time consuming process which is not economical for a flooring installer who may have a need to drive thousands of fasteners in a given flooring installation.

Referring further to FIGS. 11-13, the fastener 210 embodiment is schematically illustrated as being fully driven into substrate 269. By fully driven, it is meant that fastener body 213 and head 215 are fully, or near fully, within substrate 269 sufficient for male tongue 271 to be inserted fully into female groove 273 providing for complete interconnection of adjacent flooring elements (e.g., flooring element 211). It would not be necessary to manually countersink head 215 of fastener 210 and this represents a significant time and effort-saving advantage to the flooring installer.

The section view of FIG. 13 schematically illustrates that fastener 210 is essentially fully within flooring element 211. Fastener 210 can be fully driven into flooring element 211 because the inclined surface of head taper 259 along leading edge 253 penetrates the dense substrate 263 material and diverts away the substrate 263 material during driving. Further, the gusset-like portion 261 and material spanning from head projection 247 to shank 217 strengthens head projection 247 and improves the capability of body 213 and head 215 to fully penetrate dense substrate 263 of flooring element 211.

FIGS. 11-13, therefore, illustrate that fastener 210 and other fasteners (e.g., fastener 310) overcome the density of the substrate 269 material thereby enabling a mechanical fastener 210, 310 to be used with engineered flooring elements 211 in place of adhesive or floating flooring systems. Less force would be required to drive fastener 210, 310 fully into flooring element 211 than would be required to drive fasteners 10, 110, thereby reducing wear on the fastener-driving tool and related components such as an air compressor and compressor fittings.

Figure 14:
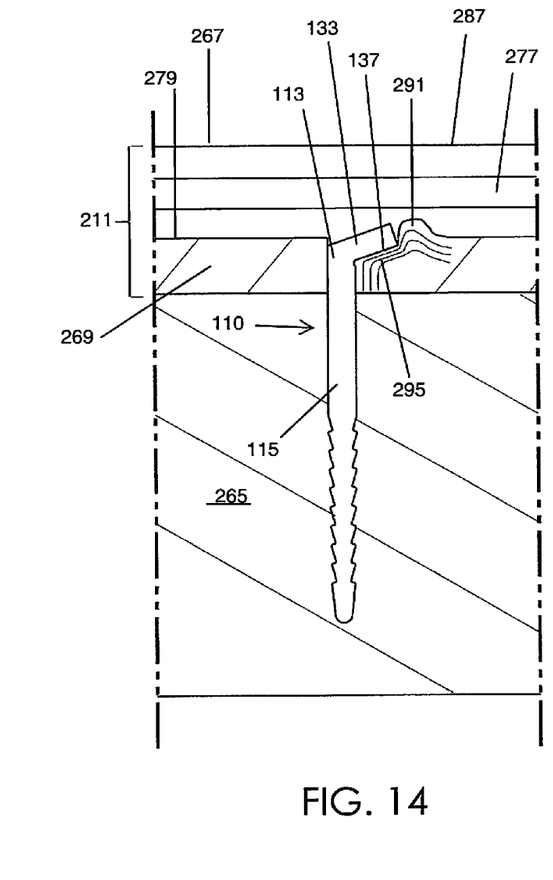
FIG. 14 is a side elevation view schematically illustrating a fastener embodiment according to FIGS. 1-2 driven into a dense engineered flooring element with superimposed curves schematically representing material displacement.
Figure 15:
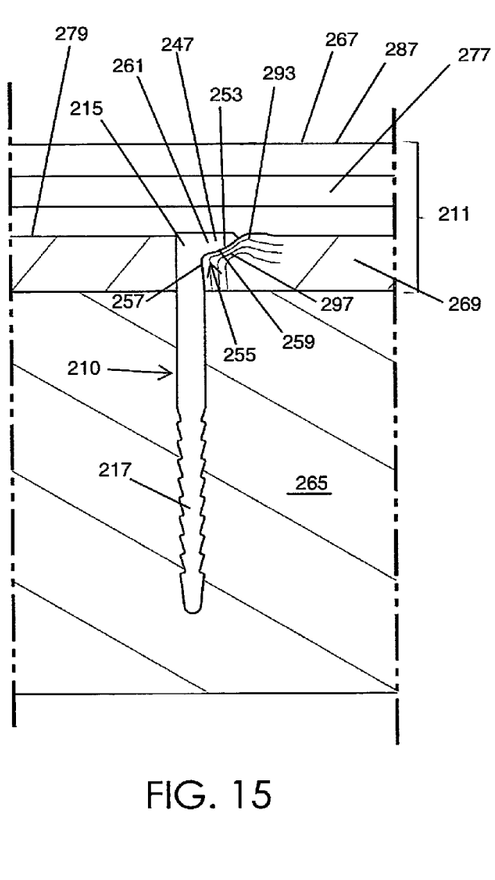
FIG. 15 is a side elevation view schematically illustrating a fastener embodiment according to FIGS. 5-6 driven into a dense engineered flooring element with superimposed curves schematically representing material displacement.

Referring next to FIGS. 13-15, those figures illustrate the improvement provided by fastener 210 with respect to blemishing of flooring element 211. FIGS. 13-15 schematically illustrate displacement of dense substrate 269 material from around fasteners 10, 110 and 210 during fastener driving in the blind fastening process previously described and the effect on blemishing of flooring element 211.

Referring first to FIGS. 13 and 15, those figures schematically illustrate that driven fasteners 10 and 110 produce a prominent raised blemish 289, 291 in flooring element 211 formed around each fastener 10, 110. FIG. 14 illustrates fastener 10 of FIG. 13, but with superimposed curves 295 to schematically illustrate the displacement of dense substrate 269 material from around fastener 10. Dense substrate 269 material is thought to be pushed by head 13 away from fastener 10 to form raised blemish 289. Edges 37, 137 perpendicular to axis 31, 131 are blunt and increase resistance to penetration of fasteners 10, 110 into flooring element 211 and the displacement of substrate 269 material. The large area of projections 33, 133 also contributes to substrate 269 material displacement.

If sufficiently severe, raised blemishes, such as blemish 289, could potentially interfere with insertion of male tongue 271 into female groove 273 preventing full interlocking of adjacent flooring elements 211. And, such a raised blemish 289 could lift veneer 267 creating visible and unattractive bumps in veneer 267 that could render the flooring installation to be considered as defective. Lifting of the veneer 267 becomes more of a problem the closer the fastener 10, 110 is driven to the veneer 267, for example in the pocket 283 formed by male tongue 271 and sidewall 285.

Blemishes, such as blemishes 289, 291, would be even more apparent if fasteners 10, 110 were driven directly into top surface 287 of flooring element 211 (i.e., a face nailing process) because the blemishes would appear on surface 287 in veneer 267 and would not have the potential to be hidden between adjacent flooring elements 211 as is the case with a blind fastening process.

Referring next to FIGS. 13 and 15, those figures schematically illustrate that a fastener 210 according to the invention causes no blemishing of flooring element 211 or, at most, causes a minor and near-imperceptible raised portion 293 on flooring element 211. FIG. 15 is thought to illustrate the reason why fastener 210 causes limited or no deformation of flooring element 211. As represented by flow-depicting curves 297, dense substrate 269 material flows into inward region 255 along edge 235 defining shank taper 257 and leading edge 253 defining head taper 259. Inward region 255 (and inward region 355 for fastener 310) provides relief along edge 235 for dense substrate 269 material to flow toward, and partially into, fastener 210. Shank taper 257 provides for inward region 255 while leading edge 253 defining head taper 259 preferably ends inward of edge 235 of shank first portion 237 to meet edge 235 in the examples.

The tapered leading edge 253 of head projection 247 serves to guide and divert dense substrate 269 material toward inward region 255 as represented by curves 297. Reinforcement of head projection 247 by gusset-like material 261 prevents bending of head 215 and failure of body 213, potentially requiring countersinking or removal of fastener 210. The fastener 210 with inclined leading edge 253 requires less force to penetrate flooring element 211 than fasteners 10, 110 with the blunt edge 37, 137. The result is that dense substrate 269 material that would otherwise be pushed up from flooring element 211 to create a blemish (e.g., blemish 289, 291) flows into inward region 255 resulting, at most, in a near-imperceptible raised portion 293. Such a minimal raised surface portion 293 would be imperceptible to a flooring installer and would not interfere with insertion of a male tongue 271 into female groove 273, thereby providing for proper interlocking of adjacent flooring elements 211. And, such a minimal raised portion 293, if it existed at all, would not lift veneer 267 to caused raised blemishes along top surface 287 of flooring element which would be deemed to be visible and unattractive.

Fastener 310, while having a body 313 which differs from body 213 of fastener 210, would also be expected to be driven easily into dense engineered flooring elements 211 and other types of workpiece types without causing surface imperfections such as blemishes 289, 291 in the same manner as illustrated in FIGS. 13 and 15 with respect to fastener 210. This is because fastener 310 has an inward portion 355 defined by edge 335 of shank taper 357 into which dense substrate 269 material can flow. And, fastener 310 has a leading edge 353 and head taper 359 which serve to guide and divert dense substrate material 269 toward inward region 355 away from projection 347. Reinforcement of head projection 347 by gusset-like material 361 prevents bending of head 315 in the same manner as head 215 illustrated in FIGS. 13 and 15.

Fasteners 210, 310, therefore, enable inexpensive mechanical fastening of dense engineered building material, such as a flooring element 211, to a subfloor 265 or like surface. Fasteners 210, 310 are robust and can be driven fully into a dense engineered building material, such as flooring element 211, while retaining their physical structure (i.e., without fastener 210, 310 deformation and bending) and with conventional application of fastener-driving force. The structure of fasteners 210, 310 with plural tapered material receiving inward region 255, 355 along edge 235, 335 enables fasteners 210, 310 to be driven with little or no damage to the work piece (e.g., no blemish 289, 291 formation) because of inward region 255, 355 in fasteners 210, 310 into which displaced dense substrate 269 material can flow. Accordingly, fasteners 210, 310 of the types exemplified herein represent an opportunity for improvement with respect to the installation of engineered flooring elements 211 and other dense engineered building materials.

While the specific embodiments have been illustrated and described, numerous modifications come to mind without significantly departing from the spirit of the invention and the scope of protection is only limited by the scope of the accompanying claims.

The invention claimed is:

1. In a substantially flat drivable unitary fastener of the type having a head and a shank which extends therefrom and defines an axis, the shank having a first portion terminating at a tip and a second portion adjacent to the head, the head including an upper striking edge substantially perpendicular to the axis and a head projection extending from a proximal end at the shank in a direction substantially perpendicular to, and away from, the axis to a distal end remote from the axis, the improvement comprising:

the fastener has first and second opposite edges;

the second portion of the shank is continuously tapered along only the second edge axially inwardly from the first portion to the head to define a material-receiving tapered inward region adjacent to the shank; and the head projection has a lower leading edge continuously tapered between the distal end and the second portion of the shank which is along the second edge such that the axially-parallel dimension of the head projection progressively increases from its distal end to its proximal end, thereby facilitating driving of the fastener such that the leading edge and the head can penetrate a workpiece without substantial bending of the head projection and workpiece material can be received in the inward region.

2. The fastener of claim 1 wherein the taper of the shank is an axial taper along the second edge.

3. The fastener of claim 1 wherein the shank has a width including a maximum width between the opposite edges and the taper in the shank narrows the width of the shank to no less than half the maximum width.

4. The fastener of claim 1 wherein the lower leading edge defines a convex taper in the head projection.

5. The fastener of claim 1 wherein the lower leading edge defines a concave taper in the head projection.

6. The fastener of claim 1 wherein the first portion of the shank further includes barbs between the tip and the second portion of the shank.

7. The fastener of claim 6 wherein the barbs are along the first and second opposite edges.

8. The fastener of claim 1 wherein the fastener further has first and second opposite planar sides and the fastener is substantially flat between the opposite planar sides.

9. The fastener of claim 8 wherein the first and second opposite edges are substantially perpendicular to the first and second planar sides.

10. The fastener of claim 1 further including a plurality of fasteners arranged in a fastener stick.

* * * * *